United States Patent
Jeon

(10) Patent No.: US 12,485,877 B2
(45) Date of Patent: Dec. 2, 2025

(54) APPARATUS AND METHOD FOR CONTROLLING VEHICLE

(71) Applicant: HL MANDO CORPORATION, Gyeonggi-do (KR)

(72) Inventor: Namju Jeon, Seoul (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 149 days.

(21) Appl. No.: 18/233,887

(22) Filed: Aug. 15, 2023

(65) Prior Publication Data

US 2024/0253616 A1     Aug. 1, 2024

(30) Foreign Application Priority Data

Feb. 1, 2023  (KR) ........................ 10-2023-0013506

(51) Int. Cl.
  *B60W 30/045*   (2012.01)
  *B60W 10/18*    (2012.01)
  (Continued)

(52) U.S. Cl.
  CPC .......... *B60W 30/045* (2013.01); *B60W 10/18* (2013.01); *B60W 40/12* (2013.01);
  (Continued)

(58) Field of Classification Search
  CPC .... B60W 30/045; B60W 10/18; B60W 40/12; B60W 2552/20; B60W 2710/18;
  (Continued)

(56) References Cited

U.S. PATENT DOCUMENTS

| | | | |
|---|---|---|---|
| 6,269,289 B1 * | 7/2001 | Toukura | B60W 30/188 73/146 |
| 2004/0107032 A1 * | 6/2004 | Farrelly | B62D 6/04 701/42 |

(Continued)

FOREIGN PATENT DOCUMENTS

| | | |
|---|---|---|
| JP | 3172333 | 6/2001 |
| KR | 10-1459459 | 11/2014 |

(Continued)

*Primary Examiner* — Yi-Kai Wang
(74) *Attorney, Agent, or Firm* — WOMBLE BOND DICKINSON (US) LLP

(57) ABSTRACT

Disclosed herein are an apparatus and method for controlling a vehicle. The apparatus for controlling a vehicle includes a sensor unit configured to output a signal corresponding to behavior information on a vehicle and a signal corresponding to information on an external environment of the vehicle, a controller configured to calculate a crosswind tendency including information on a strength and a direction of a crosswind applied to the vehicle based on the signal received from the sensor unit, calculate a partial braking torque for compensating for a pulling caused by the crosswind based on the crosswind tendency, and calculate a compensation steering torque for compensating for a steering angle deviation based on the partial braking torque, a braking unit configured to perform partial braking of the vehicle by outputting the partial braking torque, and a steering unit configured to perform steering of the vehicle by outputting the compensation steering torque.

18 Claims, 8 Drawing Sheets

(51) Int. Cl.
  *B60W 40/12* (2012.01)
  *B62D 6/10* (2006.01)
(52) U.S. Cl.
  CPC ........... *B62D 6/10* (2013.01); *B60W 2552/20* (2020.02); *B60W 2710/18* (2013.01); *B60W 2710/202* (2013.01)
(58) Field of Classification Search
  CPC ......... B60W 2710/202; B60W 10/184; B60W 10/20; B60W 2540/18; B60W 2520/10; B60W 2520/125; B60W 2520/14; B60W 2540/12; B60W 2555/20; B60W 40/06; B60W 30/02; B60W 2510/182; B60W 2520/06; B62D 6/10; B62D 15/025; B62D 6/04; B60Y 2300/02

USPC .......................................................... 701/41
See application file for complete search history.

(56) References Cited

U.S. PATENT DOCUMENTS

| 2011/0112722 | A1* | 5/2011 | Kalkkuhl | B60T 8/1755 |
| | | | | 701/41 |
| 2018/0244310 | A1* | 8/2018 | Pursifull | B62D 15/021 |
| 2020/0001861 | A1* | 1/2020 | Laberge | B60W 50/00 |
| 2022/0097713 | A1* | 3/2022 | Neubecker | B60W 40/02 |

FOREIGN PATENT DOCUMENTS

| KR | 10-2018-0039841 | 4/2018 |
| KR | 10-2335849 | 12/2021 |

* cited by examiner

APPARATUS AND METHOD FOR CONTROLLING VEHICLE

CROSS-REFERENCE TO RELATED APPLICATION

This application claims the benefit of Korean Patent Application No. 10-2023-0013506, filed on Feb. 1, 2023 in the Korean Intellectual Property Office, the disclosure of which is incorporated herein by reference.

BACKGROUND

1. Field

Embodiments of the present disclosure relate to an apparatus and method for controlling a vehicle, and more particularly, to an apparatus and method for controlling a vehicle capable of preventing a steering angle deviation caused by a crosswind when a vehicle goes straight or turns.

2. Description of the Related Art

In general, a vehicle is applied with various systems such as an electronic stability control (ESC) system, an electric power steering (EPS) system, and the like to improve driving stability and provide a driver's convenience.

More specifically, the ESC system is a device that prevents a vehicle from being driven against a driver's will, and is a system that controls the vehicle by forcibly intervening a computer program in a throttle, a brake, and the like.

In addition, the EPS system is provided such that the driver is able to control a steering with less effort by detecting a steering angle of a steering wheel, controlling a steering motor to rotate according to the detected steering angle, and providing a steering assist torque to a steering wheel axis by the steering motor.

Meanwhile, when an external force such as a crosswind, which is an external environmental factor, is applied to the vehicle or the steering wheel, a traveling direction of the vehicle is changed by the external force. Since this change in traveling direction is not a travel that is intended by the driver, the change in traveling direction may cause the vehicle to deviate from the traveling lane or, in severe cases, cause a rollover accident. In particular, SUVs and VAN-type vehicles with a high overall height are more vulnerable to the crosswind.

Accordingly, in the vehicle, technology is proposed to provide the vehicle with an ability to steer straight by compensating a steering torque through a motor driven power steering (MDPS), etc. when a sustained lateral load is detected over a certain period of time in order to minimize a pulling effect that occurs while the vehicle is traveling.

However, in the related art, the crosswind is detected only when the vehicle is traveling straight. Therefore, there is a problem that the related art is vulnerable to the crosswind that occurs when the vehicle is turning.

In addition, in the related art, as the crosswind detection is performed only by comparing an actual yaw rate with a predetermined reference yaw rate while the vehicle is traveling, there is a problem that a false detection situation of the crosswind frequently occurs.

In addition, in the related art, as a yaw moment is generated through only one of partial braking or steering control in response to the crosswind detected while the vehicle is traveling, there is a problem that an effect of preventing lane departure of the vehicle is decreased.

SUMMARY

Therefore, it is an aspect of the present disclosure to provide an apparatus and method for controlling a vehicle capable of detecting a crosswind not only in a situation where a vehicle is traveling in a straight line but also in a situation where the vehicle is turning, and accordingly improving driving stability through braking and steering control.

It is another aspect of the present disclosure to provide an apparatus and method for controlling a vehicle capable of significantly reducing false crosswind detection by comparing an actual yaw rate with a preset reference yaw rate, as well as comparing an actual transverse acceleration with a preset reference transverse acceleration.

It is still another aspect of the present disclosure to provide an apparatus and method for controlling a vehicle capable of significantly improving a straight-line driving ability and driving stability of the vehicle by generating a yaw moment with partial braking control upon detection of a crosswind and calibrating a steering angle deviation due to the partial braking through steering control.

In accordance with one aspect of the present disclosure, there is provided an apparatus for controlling a vehicle including a sensor unit configured to output a signal corresponding to behavior information on a vehicle and a signal corresponding to information on an external environment of the vehicle, a controller configured to calculate a crosswind tendency including information on a strength and a direction of a crosswind applied to the vehicle based on the signal received from the sensor unit, calculate a partial braking torque for compensating for a pulling caused by the crosswind based on the crosswind tendency, and calculate a compensation steering torque for compensating for a steering angle deviation based on the partial braking torque, a braking unit configured to perform partial braking of the vehicle by outputting the partial braking torque, and a steering unit configured to perform steering of the vehicle by outputting the compensation steering torque.

The sensor unit may include a first sensor unit configured to output signals corresponding to whether a driver assistance system of the vehicle is operating, a braking pressure based on a brake pedal operation of a driver of the vehicle, a speed of the vehicle, a transverse acceleration of the vehicle, a yaw rate of the vehicle, and an amount of change in steering of the vehicle, and a second sensor unit configured to output a signal corresponding to a road surface condition on which the vehicle is traveling.

The controller may compare an actual transverse acceleration of the vehicle with a preset reference transverse acceleration with respect to a speed of the vehicle, and compare an actual yaw rate of the vehicle with a preset reference yaw rate to calculate the crosswind tendency.

The controller may determine whether to maintain or release outputs of the partial braking torque and the compensation steering torque based on the crosswind tendency when the partial braking torque and the compensation steering torque are being output.

The controller may determine whether to output the partial braking torque and the compensation steering torque based on the crosswind tendency when the partial braking torque and the compensation steering torque are not being output.

The controller may calculate a partial braking torque of each of a front wheel and a rear wheel of the vehicle by comparing an actual yaw rate of the vehicle with a preset reference yaw rate.

The controller may calibrate and update the compensation steering torque based on a driver steering torque generated by a steering wheel operation of a driver of the vehicle.

The controller may be provided so as not to output the partial braking torque and the compensation steering torque when a driver assistance system is operating, a brake pressure applied by the driver of the vehicle to a brake pedal is greater than a preset brake pressure threshold value, a traveling speed of the vehicle is less than a preset traveling speed threshold value, a transverse acceleration of the vehicle is greater than a preset transverse acceleration threshold value, the vehicle detects an unevenness on a road surface on which the vehicle is traveling, or an amount of change in steering of the vehicle is greater than a preset amount of change in steering threshold value.

The controller may be provided so as to determine a stable state and an unstable state of the vehicle by comparing an actual transverse acceleration of the vehicle and a preset reference transverse acceleration of the vehicle with respect to a speed of the vehicle, and comparing an actual yaw rate of the vehicle and a preset reference yaw rate of the vehicle, and to calculate the crosswind tendency when determined as the stable state, and not to calculate the crosswind tendency when determined as the unstable state.

In accordance with another aspect of the present disclosure, there is provided a method of controlling a vehicle including estimating a crosswind tendency including information on a strength and a direction of a crosswind applied to a vehicle based on behavior information on the vehicle and information on an external environment of the vehicle, estimating and outputting a partial braking torque for compensating for pulling caused by the crosswind based on the crosswind tendency to partially brake the vehicle, and steering the vehicle by estimating and outputting a compensation steering angle torque for compensating for a steering angle deviation based on the partial braking torque.

The estimating of the crosswind tendency may include comparing an actual transverse acceleration of the vehicle with a preset reference transverse acceleration with respect to a speed of the vehicle, and comparing an actual yaw rate of the vehicle with a preset reference yaw rate to estimate the crosswind tendency.

The estimating of the partial braking torque may include estimating the partial braking torque of each of a front wheel and a rear wheel of the vehicle by comparing the actual yaw rate of the vehicle with the preset reference yaw rate.

The estimating of the compensation steering angle torque may include calibrating and updating the compensation steering torque based on a driver steering torque generated by a steering wheel operation of a driver of the vehicle.

The method of controlling a vehicle may further include not estimating the crosswind tendency when a control prohibition condition is recognized.

The control prohibition condition may be defined as when a driver assistance system is operating, a brake pressure applied by a driver of the vehicle to a brake pedal is greater than a preset brake pressure threshold value, a traveling speed of the vehicle is less than a preset traveling speed threshold value, a transverse acceleration of the vehicle is greater than a preset transverse acceleration threshold value, the vehicle detects an unevenness on a road surface on which the vehicle is traveling, or an amount of change in steering of the vehicle is greater than a preset amount of change in steering threshold value.

The method of controlling a vehicle may further include determining whether to maintain or release outputs of the partial braking torque and the compensation steering torque based on the crosswind tendency when the partial braking torque and the compensation steering torque are being output.

The method of controlling a vehicle may further include determining whether to output the partial braking torque and the compensation steering torque based on the crosswind tendency when the partial braking torque and the compensation steering torque are not being output.

The method of controlling a vehicle may further include comparing the actual transverse acceleration of the vehicle and the preset reference transverse acceleration of the vehicle with respect to the speed of the vehicle, comparing the actual yaw rate of the vehicle and the preset reference yaw rate of the vehicle to determine a stable state and an unstable state of the vehicle, estimating the crosswind tendency when determined as the stable state, and not estimating the crosswind tendency when determined as the unstable state.

The method of controlling a vehicle may further include determining a control entry condition for outputting the partial braking torque and the compensation steering torque based on the crosswind tendency, and outputting the partial braking torque and the compensation steering torque when the control entry condition is satisfied, and not outputting the partial braking torque and the compensation steering torque when the control entry condition is not satisfied.

The control entry condition may be set by comparing the actual transverse acceleration of the vehicle with the preset reference transverse acceleration with respect to the speed of the vehicle, and comparing the actual yaw rate of the vehicle with the preset reference yaw rate.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, embodiments of the present disclosure will be described in detail with reference to the accompanying drawings. The embodiments below are presented to sufficiently convey the ideas of the present disclosure to those skilled in the art to which the present disclosure belongs. The present disclosure is not limited to the embodiments presented herein and may be specified as other forms. To clarify the present disclosure, the drawings may omit the illustration of parts that are not related to the description, and the size of components may be somewhat exaggerated for ease of understanding.

Figure 1:
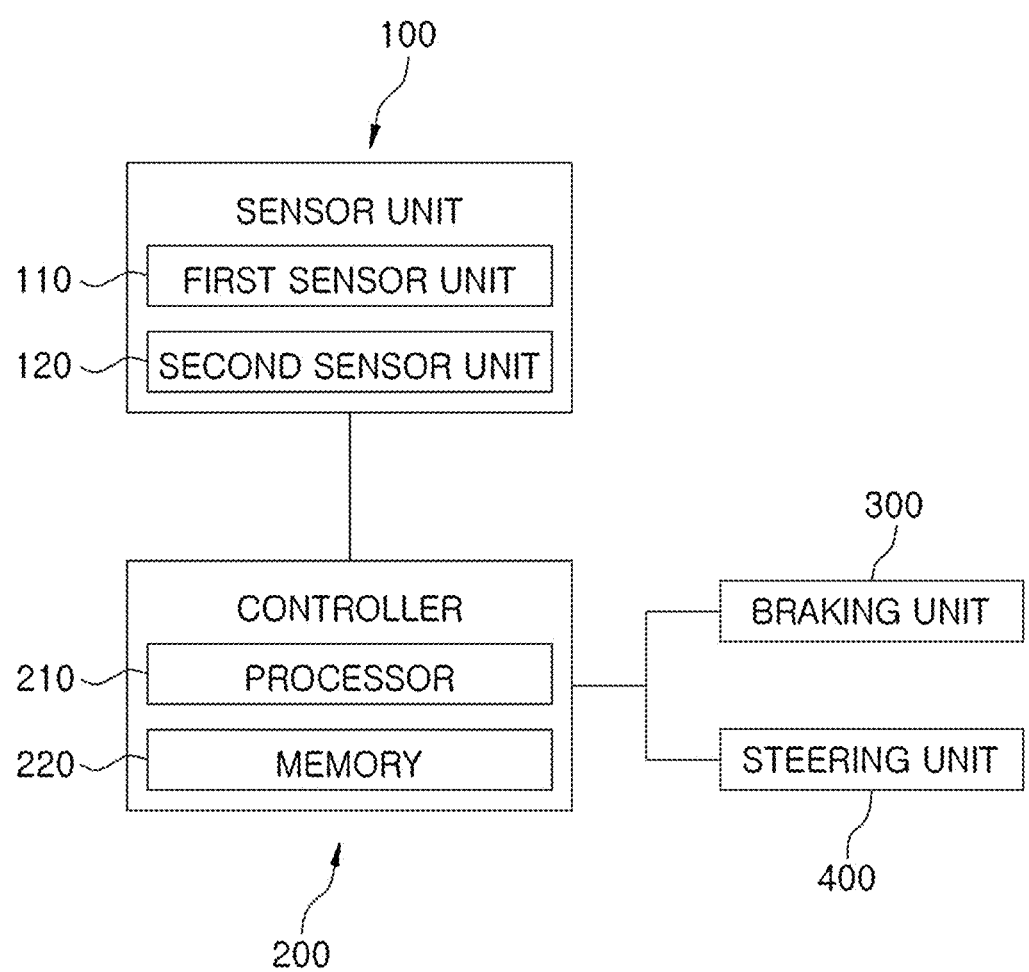
FIG. 1 is a block diagram illustrating an overall configuration of an apparatus for controlling a vehicle in accordance with one embodiment of the present disclosure.

FIG. 1 is a block diagram illustrating an overall configuration of an apparatus for controlling a vehicle in accordance with an embodiment of the present disclosure.

With reference to FIG. 1, the apparatus for controlling a vehicle in accordance with one embodiment of the present disclosure includes a sensor unit 100, a controller 200, a braking unit 300, and a steering unit 400.

The sensor unit 100 includes a first sensor unit 110 configured to output a signal corresponding to behavior information on the vehicle, and a second sensor unit 120 configured to output a signal corresponding to external environment information on the vehicle.

The first sensor unit 110 may include a plurality of sensors configured to output signals corresponding to whether a driver assistance system of the vehicle is operating, a braking pressure based on a brake pedal operation of a driver of the vehicle, a speed of the vehicle, a transverse acceleration of the vehicle, a yaw rate of the vehicle, and an amount of change in steering of the vehicle.

In this case, the driver assistance system is a system such as a traction control system (TCS), an anti-lock brake system (ABS), an electronic stability control (ESC), and the like, and a sensor for detecting whether the driver assistance system is operating may be a separate sensor or communication tool that is capable of detecting whether braking and steering of the vehicle to which the apparatus for controlling a vehicle in accordance with one embodiment of the present disclosure is applied are already outputting braking and steering forces by control of each system.

The second sensor unit 120 may be a plurality of radars, ultrasonic sensors, or the like that output a signal corresponding to a road surface condition on which the vehicle is traveling. More specifically, the second sensor unit 120 may detect unevenness on the road surface on which the vehicle is traveling to which the apparatus for controlling a vehicle by one embodiment of the present disclosure is applied.

Meanwhile, the controller 200 may include a processor 210 and a memory 220.

The processor 210 may control an overall operation of the apparatus for controlling a vehicle in accordance with one embodiment of the present disclosure.

The memory 220 may store a program for processing or controlling the processor 210 and various data for an operation of the apparatus for controlling a vehicle in accordance with one embodiment of the present disclosure.

For example, the memory 620 may include volatile memories, such as an S-RAM and a D-RAM, as well as non-volatile memories, such as a flash memory, a read only memory (ROM), and an erasable programmable read only memory (EPROM).

The controller 200 calculates a crosswind tendency including information on the strength and direction of a crosswind applied to the vehicle based on the signal received from the sensor unit 100, calculates a partial braking torque for compensating for a pulling caused by the crosswind based on the crosswind tendency, and calculates a compensation steering torque for compensating for a steering angle deviation based on the partial braking torque.

Meanwhile, the braking unit 300 performs partial braking of the vehicle for compensating for a pulling caused by a crosswind by outputting the partial braking torque calculated from the controller 200, and may be an electronic braking system including an electronic stability control (ESC) system.

In addition, the steering unit 400 performs compensation steering of the vehicle to compensate for the steering angle deviation caused by the partial braking torque output by outputting the compensation steering torque calculated from the controller 200, and may be an electronic steering system including an electric power steering (EPS) system.

Hereafter, for convenience of description, a yaw rate error is defined as a value of an actual yaw rate (measured yaw rate) minus a preset reference yaw rate (reference yaw rate), and a transverse rate error (ay error) is defined as a value of an actual transverse acceleration (measured ay) minus a preset reference transverse acceleration (reference ay). Here, the reference yaw rate and the reference transverse acceleration are theoretical values calculated from a speed of the vehicle and a steering angle, respectively, using the transverse dynamics equations of the vehicle. In addition, a threshold value (TH) is a preset value and is the same value only in case of the same number, and a sign (+, −) added before the threshold value means a direction.

In addition, it is defined as a control activation that the controller 200 calculates the crosswind tendency, the partial braking torque, and the compensation steering torque as described above, and it is defined as a control deactivation that the controller 200 does not calculate the crosswind tendency, the partial braking torque, and the compensation steering torque, or calculates the crosswind tendency but does not calculate the partial braking torque and the compensation steering torque.

Figure 2:
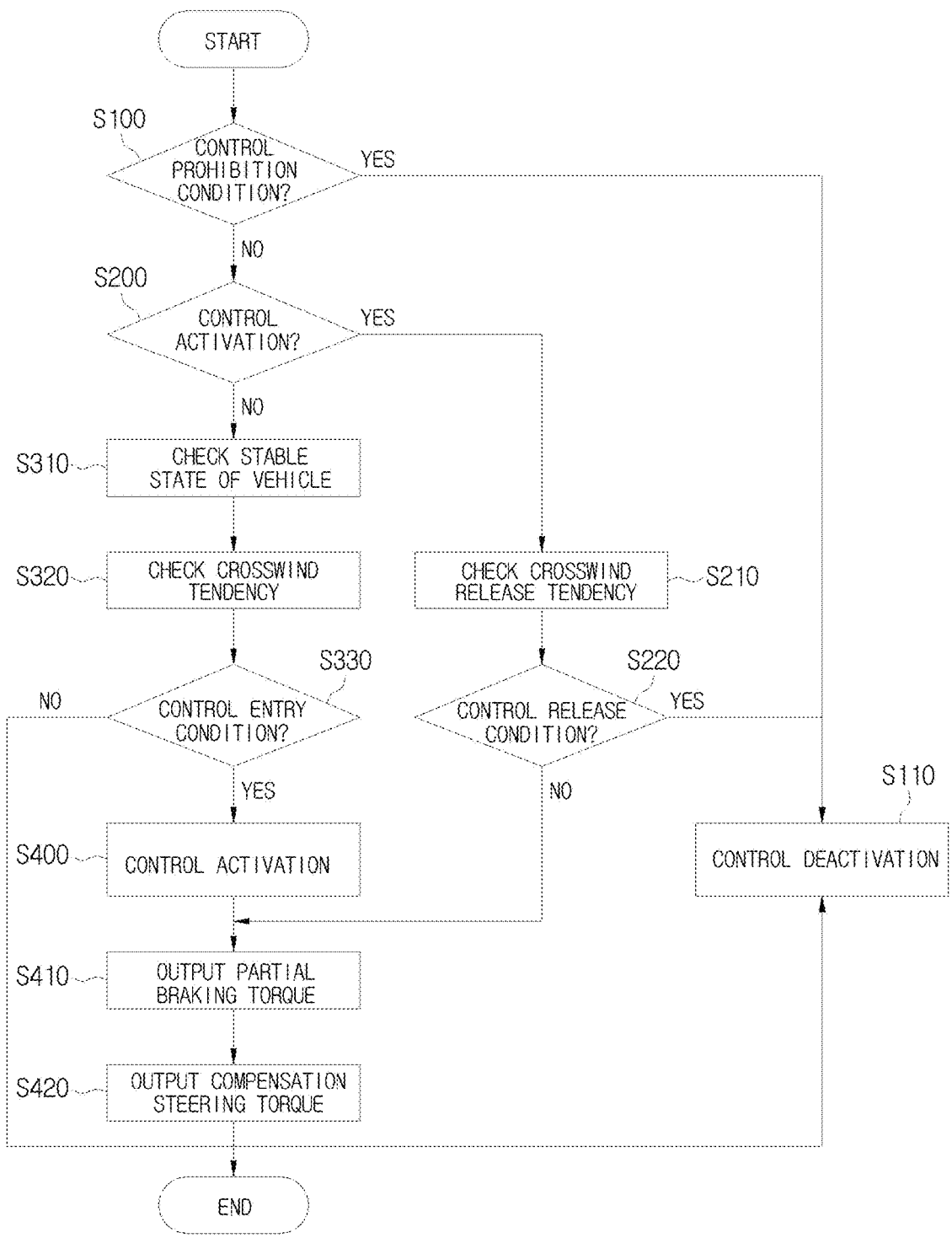
FIG. 2 is a flowchart illustrating an operating algorithm of the apparatus for controlling a vehicle in accordance with one embodiment of the present disclosure.

FIG. 2 is a flowchart illustrating an operating algorithm of the apparatus for controlling a vehicle in accordance with one embodiment of the present disclosure.

With reference to FIG. 2, the controller 200 performs the control deactivation (110) when a control prohibition condition is recognized (100).

Here, the control prohibition condition is defined as when the driver assistance system as described above is operating, the brake pressure applied by the driver of the vehicle to the brake pedal is greater than a preset brake pressure threshold value TH1, a traveling speed of the vehicle is less than a preset traveling speed threshold value TH2, a transverse acceleration of the vehicle is greater than a preset transverse acceleration threshold value TH3, the vehicle detects an unevenness on the road surface on which the vehicle is traveling, or the amount of change in steering of the vehicle is greater than a preset amount of change in steering threshold value TH4.

In contrast, when the controller 200 does not recognize the control prohibition condition, the controller 200 determines whether the control is being activated (200).

In this case, when the controller 200 detects that the control is being activated, the controller 200 determines whether to maintain or release an output of the partial braking torque and the compensation steering torque based on the crosswind tendency. That is, when the controller 200 detects that the control is being activated, the controller 200 determines whether to maintain the control activation or deactivate the control based on the crosswind tendency.

In general, for the crosswind that causes the phenomenon of the vehicle pull, the actual transverse acceleration and the actual yaw rate are larger in the same direction than the reference transverse acceleration and the reference yaw rate, respectively, and for the crosswind that does not cause the phenomenon of the vehicle pulls, the actual transverse acceleration and the actual yaw rate are larger in an opposite direction than the reference transverse acceleration and the reference yaw rate, respectively.

Accordingly, when each of an amount of change in yaw rate error (yaw rate error dot) and an amount of change in value obtained by dividing the transverse acceleration error (ay error) by the traveling direction speed Vx of the vehicle is greater than a preset release threshold value TH11, the controller 200 recognizes that control is being activated for the left crosswind, and when each of the amount of change in yaw rate error (yaw rate error dot) and the amount of change in value obtained by dividing the transverse acceleration error (ay error) by the traveling direction speed Vx of the vehicle is greater than a preset release threshold value $-TH11$, the controller 200 recognizes that control is being activated for the right crosswind (210).

In this case, the controller 200 deactivates the control (110) when the controller 200 does not recognize that the control is being activated for the left or right crosswind, or when a control release condition in which the partial braking torque is greater than the preset partial braking torque threshold value TH12 is recognized (220), and the controller 200 does not recognize the control release condition and maintains the control activation when the partial braking torque is less than the preset partial braking torque threshold value TH12.

Meanwhile, when the controller 200 does not recognize the control prohibition condition and recognizes the control deactivation, the controller 200 determines a stable state and an unstable state of the vehicle by comparing the actual transverse acceleration of the vehicle with the preset reference transverse acceleration, and comparing the actual yaw rate of the vehicle with the preset reference yaw rate, respectively, with respect to the speed of the vehicle (310).

More specifically, when each of the values obtained by dividing the yaw rate error and the transverse acceleration error (ay error) by the speed of the vehicle Vx is less than a preset state first threshold value TH5, and when each of the amount of change in yaw rate error (yaw rate error dot) and the amount of change in value obtained by dividing the transverse acceleration error (ay error) by the speed Vx of the vehicle is less than a preset state second threshold value TH6, the controller 200 determines that the vehicle is in a stable state. When any of the conditions described above is not satisfied, the controller 200 determines that the vehicle is in an unstable state.

In this case, when the controller 200 determines that the vehicle is in an unstable state, the control is deactivated (110).

Meanwhile, when the controller 200 determines that the vehicle is in a stable state, the crosswind tendency is calculated by comparing the actual transverse acceleration of the vehicle with the preset reference transverse acceleration with respect to the speed of the traveling direction of the vehicle, and comparing the actual yaw rate of the vehicle with the preset reference yaw rate.

More specifically, when a value of the amount of change in the actual transverse acceleration (measured ay dot) minus the amount of change in the reference transverse acceleration (reference ay dot) is greater than a preset tendency first threshold value TH7, and when each of the amount of change in yaw rate error (yaw rate error dot) and the amount of change in value obtained by dividing the transverse acceleration error (ay error) by the speed Vx of the vehicle is greater than a preset tendency second threshold value TH8 in a "+" direction or less than the preset tendency second threshold value $-TH8$ in a "$-$" direction, the controller 200 checks the crosswind tendency (320).

Thereafter, in order to determine a control activation condition (330), the controller 200 calculates the partial braking torque and the compensation steering torque for the right crosswind when each of the value obtained by dividing the yaw rate error by the speed Vx of the vehicle and the value obtained by dividing the transverse acceleration error (ay error) by the speed Vx of the vehicle is greater than a preset entry threshold value TH9 in the "+" direction, and the controller 200 calculates the partial braking torque and the compensation steering torque for the left crosswind when each of the value obtained by dividing the yaw rate error by the speed Vx of the vehicle and the value obtained by dividing the transverse acceleration error (ay error) by the speed Vx of the vehicle is less than the preset entry threshold value TH9 in the "$-$" direction.

That is, the controller 200 compares the actual transverse acceleration of the vehicle with the preset reference transverse acceleration as described above, compares the actual yaw rate of the vehicle with the preset reference yaw rate to determine the stable state of the vehicle (310), checks the crosswind tendency (320), determines the control activation condition (330), and finally calculates the crosswind tendency (300).

Figure 3:
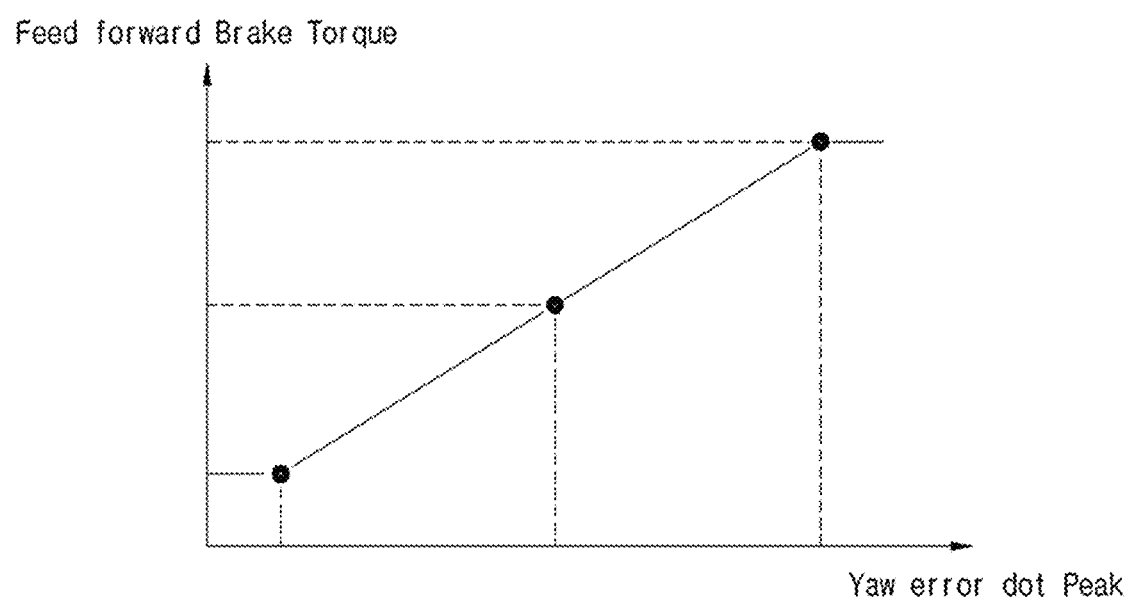
FIG. 3 is a graph illustrating a relationship between a partial braking torque and a magnitude of a yaw rate error change value, in the apparatus for controlling a vehicle in accordance with one embodiment of the present disclosure.

FIG. 3 is a graph illustrating a relationship between a partial braking torque and a magnitude of a yaw rate error change value in the apparatus for controlling a vehicle in accordance with one embodiment of the present disclosure.

With reference to FIG. 3, the controller 200 calculates a partial braking torque of each of a front wheel and a rear wheel of the vehicle by comparing the actual yaw rate of the vehicle with the preset reference yaw rate.

More specifically, the controller 200 calculates the partial braking torque (feed forward brake torque) to be output to the front wheel side of the vehicle to increase in proportion to an increase in a maximum value of the amount of change in the yaw rate error (a yaw error dot peak), as illustrated in FIG. 3. In this case, the partial braking torque to be output to the rear wheel side of the vehicle is calculated based on the partial braking torque to be output to the front wheel side of the vehicle calculated as described above. Hereinafter, unless otherwise specified, the partial braking torque means the sum of the partial braking torques to be output to each side of the front and rear wheels of the vehicle calculated as described above.

Figure 4:
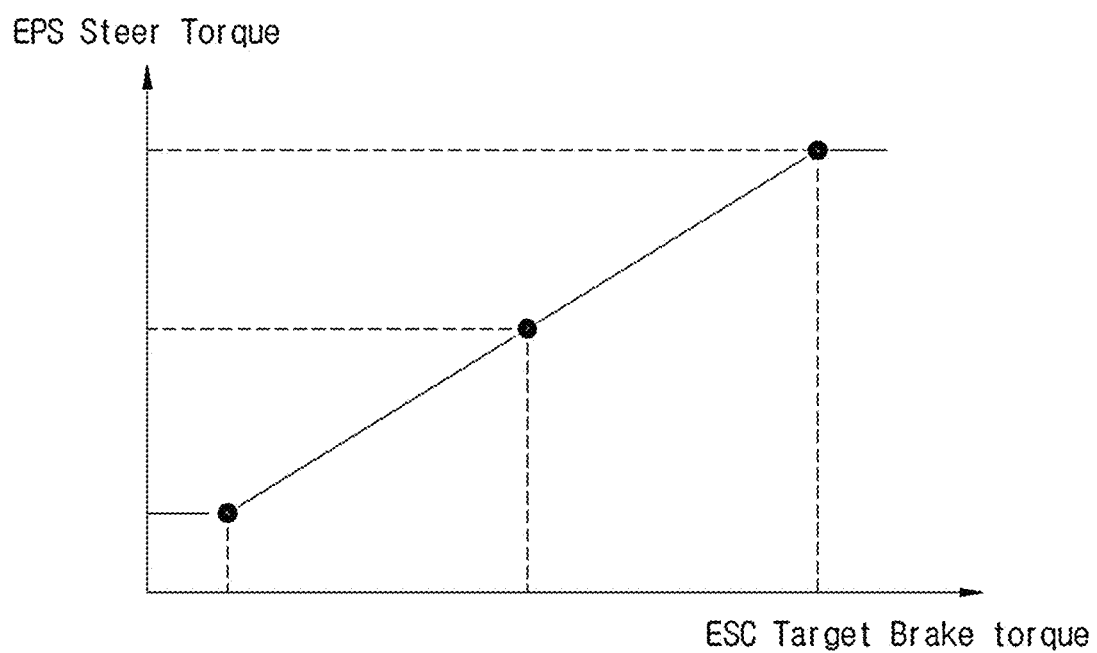
FIG. 4 is a graph illustrating a relationship between a compensation steering torque and a partial braking torque in the apparatus for controlling a vehicle in accordance with one embodiment of the present disclosure.

FIG. 4 is a graph illustrating a relationship between a compensation steering torque and a partial braking torque in the apparatus for controlling a vehicle in accordance with one embodiment of the present disclosure.

Figure 5:
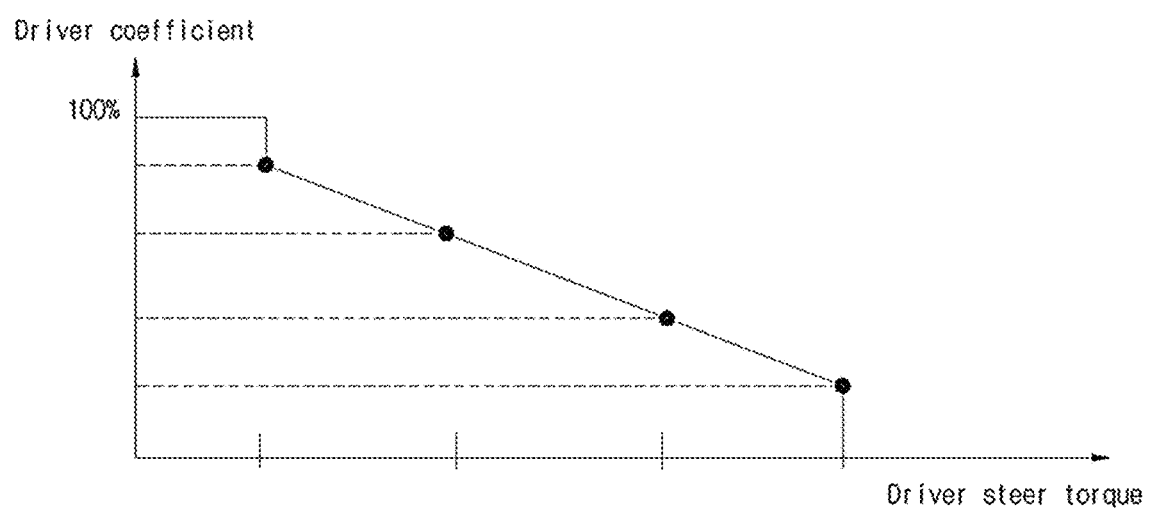
FIG. 5 is a graph illustrating a relationship between a driver steering torque and a compensation steering torque in the apparatus for controlling a vehicle in accordance with one embodiment of the present disclosure.

FIG. 5 is a graph illustrating a relationship between a driver steering torque and a compensation steering torque in the apparatus for controlling a vehicle in accordance with one embodiment of the present disclosure.

With reference to FIGS. 4 and 5, the controller 200 calculates the compensation steering torque to increase in proportion to an increase in the partial braking torque.

In this case, the controller 200 may calibrate and update the compensation steering torque based on the driver steering torque generated by a steering wheel operation of the driver of the vehicle.

More specifically, as illustrated in FIG. 5, the compensation steering torque may be calibrated to decrease with respect to the driver steering torque, which increases as a driver's steering wheel operation angle (a driver coefficient) increases.

Figure 6:
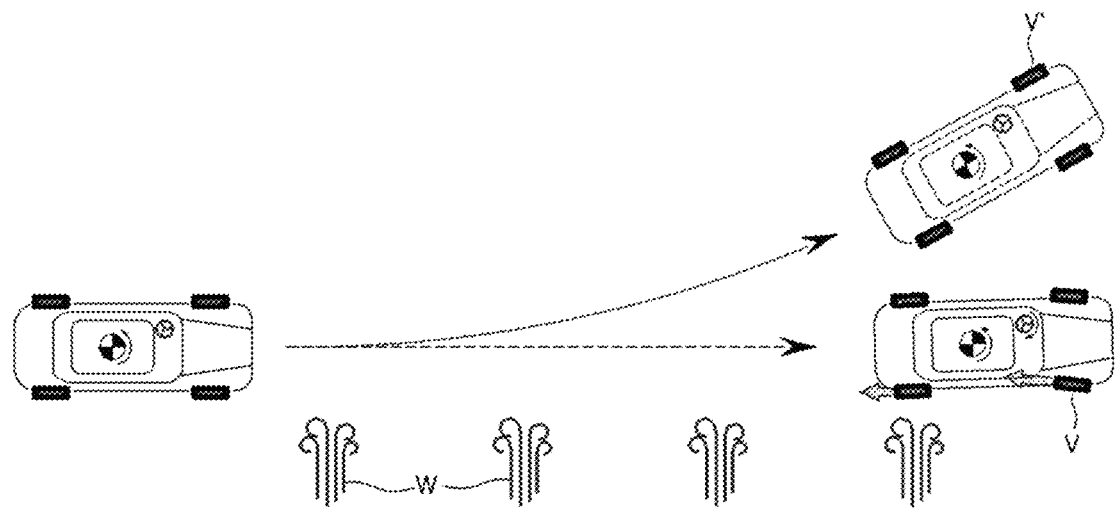
FIG. 6 is a schematic view illustrating a state in which crosswind control for a right crosswind is performed through the apparatus for controlling a vehicle in accordance with one embodiment of the present disclosure.

FIG. 6 is a schematic view illustrating a state in which crosswind control for a left crosswind is performed through the apparatus for controlling a vehicle in accordance with one embodiment of the present disclosure.

With reference to FIG. 6, a vehicle V in which the apparatus for controlling a vehicle in accordance with one embodiment of the present disclosure is operating is capable of maintaining driving stability by outputting the partial braking torque to each of a right front wheel and a right rear wheel to prevent the pulling phenomenon due to the yaw moment generated in a counterclockwise direction by the right crosswind, and outputting the compensation steering torque in response to the steering angle deviation generated due to the partial braking torque.

In contrast, it can be seen that a general vehicle V' without the apparatus for controlling a vehicle in accordance with one embodiment of the present disclosure turns to the left due to the pulling phenomenon caused by the yaw moment generated in the counterclockwise direction by the right crosswind.

Figure 7:
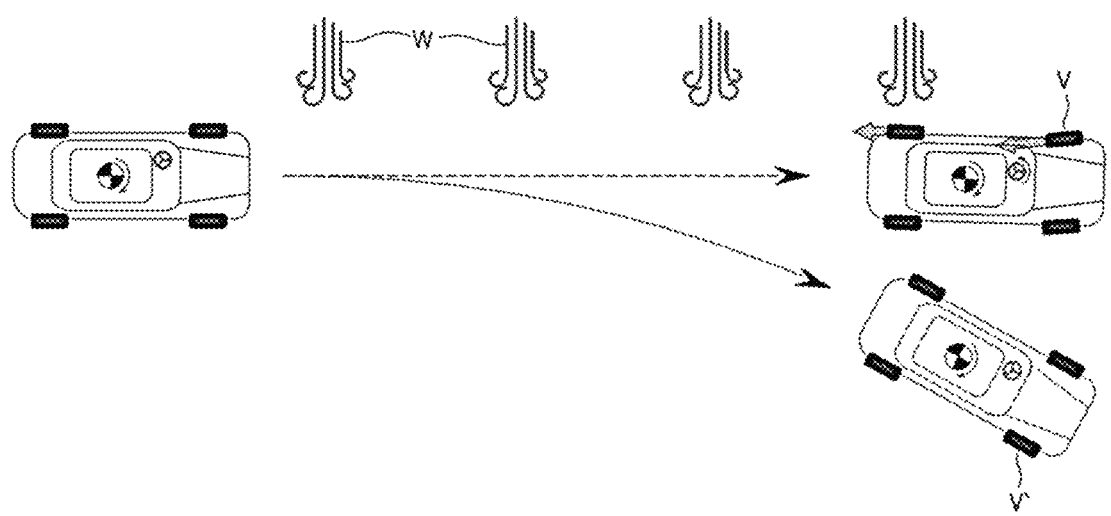
FIG. 7 is a schematic view illustrating a state in which crosswind control for a left crosswind is performed through the apparatus for controlling a vehicle in accordance with one embodiment of the present disclosure.

FIG. 7 is a schematic view illustrating a state in which crosswind control for a left crosswind is performed through the apparatus for controlling a vehicle in accordance with one embodiment of the present disclosure.

With reference to FIG. 7, the vehicle V in which the apparatus for controlling a vehicle in accordance with one embodiment of the present disclosure is operating is capable of maintaining driving stability by outputting the partial braking torque to each of a left front wheel and a left rear wheel to prevent the pulling phenomenon caused by the yaw moment generated in a clockwise direction by the left crosswind, and outputting the compensation steering torque in response to the steering angle deviation caused by the partial braking torque.

In contrast, it can be seen that the general vehicle V' without the apparatus for controlling a vehicle in accordance with one embodiment of the present disclosure turns to the right due to the pulling phenomenon caused by the yaw moment generated in the clockwise direction by the left crosswind.

Figure 8:
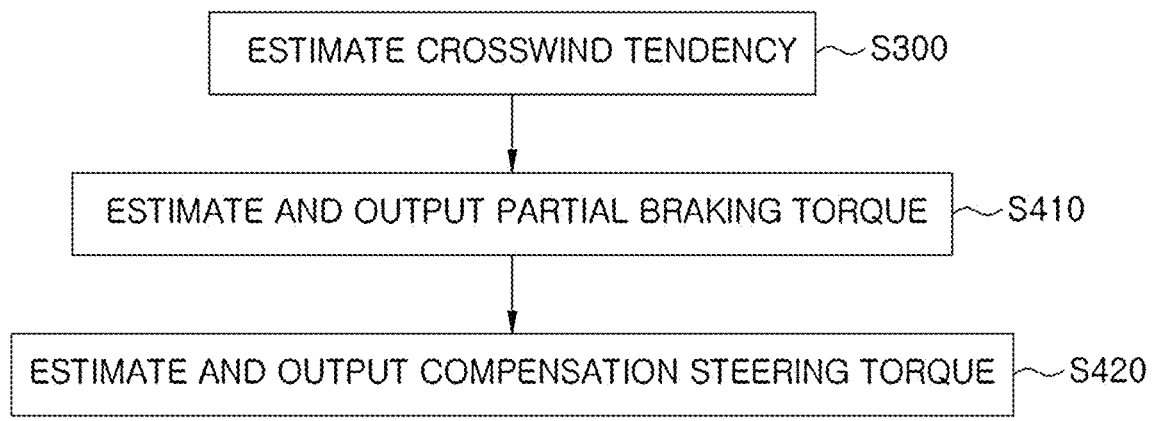
FIG. 8 is a flowchart illustrating a main step of a method of controlling a vehicle in accordance with one embodiment of the present disclosure.

FIG. 8 is a flowchart illustrating a main step of a method of controlling a vehicle in accordance with one embodiment of the present disclosure.

With reference to FIG. 8, the method of controlling a vehicle in accordance with one embodiment of the present disclosure includes estimating a crosswind tendency including information on the strength and direction of a crosswind applied to the vehicle based on behavior information on a vehicle and information on an external environment of the vehicle (300), estimating and outputting a partial braking torque for compensating for pulling caused by the crosswind based on the crosswind tendency to partially brake the vehicle (410), and steering the vehicle by estimating and outputting a compensation steering angle torque for compensating for a steering angle deviation based on the partial braking torque (420).

The estimating of the crosswind tendency may include comparing an actual transverse acceleration of the vehicle with a preset reference transverse acceleration with respect to a speed of the vehicle, and comparing an actual yaw rate of the vehicle with a preset reference yaw rate to estimate the crosswind tendency.

In addition, the estimating of the partial braking torque may include estimating the partial braking torque of each of a front wheel and a rear wheel of the vehicle by comparing the actual yaw rate of the vehicle with the preset reference yaw rate.

In addition, the estimating of the compensation steering angle torque may include calibrating and updating the compensation steering torque based on a driver steering torque generated by a steering wheel operation of a driver of the vehicle.

Meanwhile, in the method of controlling a vehicle, control may be deactivated without estimating the crosswind tendency when a control prohibition condition is recognized.

Here, the control prohibition condition may be defined as when a driver assistance system is operating, a brake pressure applied by the driver of the vehicle to a brake pedal is greater than a preset brake pressure threshold value, a traveling speed of the vehicle is less than a preset traveling speed threshold value, a transverse acceleration of the vehicle is greater than a preset transverse acceleration threshold value, the vehicle detects an unevenness on the road surface on which the vehicle is traveling, or an amount of change in steering of the vehicle is greater than a preset amount of change in steering threshold value.

In addition, the method of controlling a vehicle may further include determining whether to maintain or release outputs of the partial braking torque and the compensation steering torque based on the crosswind tendency when the partial braking torque and the compensation steering torque are being output.

The method of controlling a vehicle may further include determining whether to output the partial braking torque and the compensation steering torque based on the crosswind tendency when the partial braking torque and the compensation steering torque are not being output.

The method of controlling a vehicle may further include comparing the actual transverse acceleration of the vehicle and the preset reference transverse acceleration of the vehicle with respect to the speed of the vehicle, comparing the actual yaw rate of the vehicle and the preset reference yaw rate of the vehicle to determine a stable state and an unstable state of the vehicle, estimating the crosswind tendency when determined as the stable state, and not estimating the crosswind tendency when determined as the unstable state.

The method of controlling a vehicle may further include determining a control entry condition for outputting the partial braking torque and the compensation steering torque based on the crosswind tendency, and outputting the partial braking torque and the compensation steering torque when the control entry condition is satisfied and not outputting the partial braking torque and the compensation steering torque when the control entry condition is not satisfied.

In this case, the control entry condition may be set by comparing the actual transverse acceleration of the vehicle with the preset reference transverse acceleration with respect to the speed of the vehicle and comparing the actual yaw rate of the vehicle with the preset reference yaw rate.

An apparatus and method for controlling a vehicle in accordance with the present embodiment can detect a crosswind not only in a situation where a vehicle is traveling in a straight line but also in a situation where the vehicle is turning, and accordingly improve driving stability through braking and steering control.

An apparatus and method for controlling a vehicle in accordance with the present embodiment can accurately detect a crosswind through a comparison of an actual yaw rate with a preset reference yaw rate, as well as a comparison of an actual transverse acceleration with a preset reference transverse acceleration.

An apparatus and method for controlling a vehicle in accordance with the present embodiment can significantly improve a straight-line driving ability and driving stability of the vehicle by generating a yaw moment with partial braking control upon detection of a crosswind and calibrating a steering angle deviation due to the partial braking through steering control.

As described above, the disclosed embodiments have been described with reference to the accompanying drawings. A person skilled in the art to which the present disclosure belongs will understand that the present disclosure may be carried out in different forms from the disclosed embodiments without changing the technical spirit or the essential characteristics of the present disclosure. The disclosed embodiments are exemplary and should not be interpreted as being restrictive.

What is claimed is:

1. An apparatus for controlling a vehicle comprising:
a controller configured to
calculate a crosswind tendency including information on a strength and a direction of a crosswind applied to the vehicle based on signals corresponding to behavior information on the vehicle and information on an external environment of the vehicle;
calculate a partial braking torque for compensating for a pulling caused by the crosswind based on the crosswind tendency;
calculate a compensation steering torque for compensating for a steering angle deviation based on the partial braking torque; and
calibrate and update the compensation steering torque based on a driver steering torque generated by a steering wheel operation of a driver of the vehicle, such that the compensation steering torque decreases as the driver steering torque increases.

2. The apparatus of claim 1, wherein the signals used by the controller include:
signals corresponding to whether a driver assistance system of the vehicle is operating, a braking pressure based on a brake pedal operation of a driver of the vehicle, a speed of the vehicle, a transverse acceleration of the vehicle, a yaw rate of the vehicle, and an amount of change in steering of the vehicle, and
a road surface condition on which the vehicle is traveling.

3. The apparatus of claim 1, wherein the controller compares an actual transverse acceleration of the vehicle with a preset reference transverse acceleration with respect to a speed of the vehicle, and compares an actual yaw rate of the vehicle with a preset reference yaw rate to calculate the crosswind tendency.

4. The apparatus of claim 1, wherein the controller determines whether to maintain or release outputs of the partial braking torque and the compensation steering torque based on the crosswind tendency when the partial braking torque and the compensation steering torque are being output.

5. The apparatus of claim 1, wherein the controller determines whether to output the partial braking torque and the compensation steering torque based on the crosswind tendency when the partial braking torque and the compensation steering torque are not being output.

6. The apparatus of claim 1, wherein the controller calculates a partial braking torque of each of a front wheel and a rear wheel of the vehicle by comparing an actual yaw rate of the vehicle with a preset reference yaw rate.

7. The apparatus of claim 1, wherein the controller does not output the partial braking torque and the compensation steering torque when a driver assistance system is operating, a brake pressure applied by the driver of the vehicle to a brake pedal is greater than a preset brake pressure threshold value, a traveling speed of the vehicle is less than a preset traveling speed threshold value, a transverse acceleration of the vehicle is greater than a preset transverse acceleration threshold value, the vehicle detects an unevenness on a road surface on which the vehicle is traveling, or an amount of change in steering of the vehicle is greater than a preset amount of change in steering threshold value.

8. The apparatus of claim 1, wherein the controller determines a stable state and an unstable state of the vehicle by comparing an actual transverse acceleration of the vehicle and a preset reference transverse acceleration of the vehicle with respect to a speed of the vehicle, and comparing an actual yaw rate of the vehicle and a preset reference yaw rate of the vehicle, calculates the crosswind tendency when determined as the stable state, and does not calculate the crosswind tendency when determined as the unstable state,
wherein the stable state is determined when both the actual transverse acceleration and the actual yaw rate are equal to or less than the respective reference values, and the unstable state is determined otherwise.

9. A method of controlling a vehicle, comprising:
estimating a crosswind tendency including information on a strength and a direction of a crosswind applied to a vehicle based on behavior information on the vehicle and information on an external environment of the vehicle;
estimating and outputting a partial braking torque for compensating for pulling caused by the crosswind based on the crosswind tendency to partially brake the vehicle; and
steering the vehicle by estimating and outputting a compensation steering angle torque for compensating for a steering angle deviation based on the partial braking torque,
wherein the estimating of the compensation steering angle torque includes calibrating and updating the compensation steering torque based on a driver steering torque generated by a steering wheel operation of a driver of the vehicle, such that the compensation steering torque decreases as the driver steering torque increases.

10. The method of claim 9, wherein the estimating of the crosswind tendency includes:
comparing an actual transverse acceleration of the vehicle with a preset reference transverse acceleration with respect to a speed of the vehicle; and
comparing an actual yaw rate of the vehicle with a preset reference yaw rate to estimate the crosswind tendency.

11. The method of claim 9, wherein the estimating of the partial braking torque includes estimating a partial braking torque of each of a front wheel and a rear wheel of the vehicle by comparing an actual yaw rate of the vehicle with a preset reference yaw rate.

12. The method of claim 9, further comprising not estimating the crosswind tendency when a control prohibition condition is recognized.

13. The method of claim 12, the control prohibition condition is defined as when a driver assistance system is operating,
- a brake pressure applied by a driver of the vehicle to a brake pedal is greater than a preset brake pressure threshold value,
- a traveling speed of the vehicle is less than a preset traveling speed threshold value,
- a transverse acceleration of the vehicle is greater than a preset transverse acceleration threshold value,
- the vehicle detects an unevenness on a road surface on which the vehicle is traveling, or
- an amount of change in steering of the vehicle is greater than a preset amount of change in steering threshold value.

14. The method of claim 9, further comprising determining whether to maintain or release outputs of the partial braking torque and the compensation steering torque based on the crosswind tendency when the partial braking torque and the compensation steering torque are being output.

15. The method of claim 9, further comprising determining whether to output the partial braking torque and the compensation steering torque based on the crosswind tendency when the partial braking torque and the compensation steering torque are not being output.

16. The method of claim 9, further comprising:
- comparing an actual transverse acceleration of the vehicle and a preset reference transverse acceleration of the vehicle with respect to a speed of the vehicle;
- comparing an actual yaw rate of the vehicle and a preset reference yaw rate of the vehicle to determine a stable state and an unstable state of the vehicle;
- estimating the crosswind tendency when determined as the stable state; and
- not estimating the crosswind tendency when determined as the unstable state,
- wherein the stable state is determined when both the actual transverse acceleration and the actual yaw rate are equal to or less than the respective reference values, and the unstable state is determined otherwise.

17. The method of claim 9, further comprising:
- determining a control entry condition for outputting the partial braking torque and the compensation steering torque based on the crosswind tendency;
- outputting the partial braking torque and the compensation steering torque when the control entry condition is satisfied; and
- not outputting the partial braking torque and the compensation steering torque when the control entry condition is not satisfied.

18. The method of claim 17, wherein the control entry condition is set by comparing an actual transverse acceleration of the vehicle with a preset reference transverse acceleration with respect to a speed of the vehicle, and comparing an actual yaw rate of the vehicle with a preset reference yaw rate.

* * * * *